(No Model.)

E. H. CROSBY.
HOSE PIPE.

No. 397,171. Patented Feb. 5, 1889.

Witnesses:
Edgar A. Goddin
Frederick L. Emery

Inventor:
Edward H. Crosby
by Crosby & Gregory
attys

UNITED STATES PATENT OFFICE.

EDWARD H. CROSBY, OF BOSTON, MASSACHUSETTS.

HOSE-PIPE.

SPECIFICATION forming part of Letters Patent No. 397,171, dated February 5, 1889.

Application filed November 1, 1888. Serial No. 289,733. (No model.)

*To all whom it may concern:*

Be it known that I, EDWARD H. CROSBY, of Boston, county of Suffolk, State of Massachusetts, have invented an Improvement in Hose-Pipes, of which the following description, in connection with the accompanying drawings, is a specification, like letters on the drawings representing like parts.

This invention has for its object to provide a hose pipe or nozzle with an electric generator to be used for generating a current for signaling purposes between the hoseman and the engineer or attendant at the engine.

In accordance with this invention a suitable bracket or support is attached to the pipe for supporting the generator, and, as herein shown, galvanic batteries are used as generators, they being composed of metallic tubes fastened to the pipe by the supports, said tubes being closed at the ends and serving as handles by which the pipe is held. Conductors lead from the poles of the batteries, which lead to the line.

Figure 1:
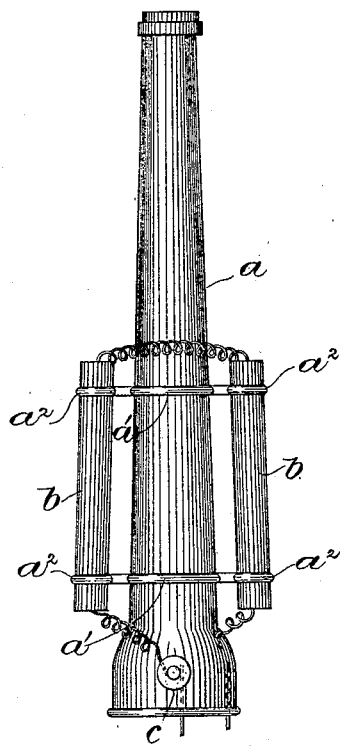
Figure 2:
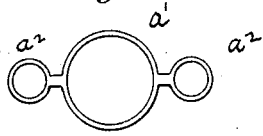

Figure 1 shows in side elevation a hose-pipe provided with an electric generator embodying this invention, and Fig. 2 a detail of the support for the generators.

The hose-pipe $a$, of usual construction, has secured to it two supports, each comprising a ring, $a'$, embracing the pipe and two smaller rings, $a^2$. Metallic tubes 2 are placed at each side of the pipe $a$, being held rigidly by the rings $a^2$ of the support. These tubes are closed at each end, and are provided at each end with one pole and from which the conductor leads. The material contained in the tubes may be that usually employed in what is known as the "dry-cell battery." A press-button, $c$, is seated in the tube or fixed to it. The batteries thus provided are made strong and durable, to serve as handles for the pipe.

By providing the generator at the pipe, as herein shown, it has been found in practice to be always fresh and not liable to be out of order. The current can be more easily controlled, and a less quantity is required.

I claim—

The hose pipe or nozzle $a$ and a support or bracket secured to it, combined with an electric generator held by said support, all as and for the purpose specified.

In testimony whereof I have signed my name to this specification in the presence of two subscribing witnesses.

EDWARD H. CROSBY.

Witnesses:
BERNICE J. NOYES,
B. DEWAR.